United States Patent [19]

Yates et al.

[11] 4,171,626

[45] Oct. 23, 1979

[54] CARBON FIBER REINFORCED COMPOSITE DRIVE SHAFT

[75] Inventors: Derek N. Yates, Los Gatos; David B. Rezin, Santa Clara, both of Calif.

[73] Assignee: Celanese Corporation, New York, N.Y.

[21] Appl. No.: 890,232

[22] Filed: Mar. 27, 1978

[51] Int. Cl.² .......................... F16C 1/02; B32B 1/08
[52] U.S. Cl. ........................................ 64/1 S; 64/1 R; 138/130; 138/144; 138/DIG. 2; 156/173; 428/36; 428/367; 428/392; 428/902
[58] Field of Search ................. 428/36, 367, 392, 902; 64/1 S, 2 R, 1 R; 301/126; 156/173; 138/130, 144, DIG. 2; 273/80 R

[56] References Cited

U.S. PATENT DOCUMENTS

| 3,651,661 | 3/1972 | Darrow | 138/44 |
|---|---|---|---|
| 4,041,599 | 8/1977 | Smith | 156/295 |
| 4,089,190 | 5/1978 | Morgan et al. | 64/2 R |

FOREIGN PATENT DOCUMENTS 52-127542 of 1977 Japan.

Primary Examiner—George F. Lesmes
Assistant Examiner—P. Thibodeau

[57] ABSTRACT

A carbon fiber reinforced composite tubular drive shaft is provided wherein the fibrous reinforcement is positioned in a structural configuration capable of yielding improved service characteristics. The wall of the drive shaft comprises at least four bonded circumferentially disposed layers composed of appropriate fibrous reinforcement situated within a resin matrix (as described). The carbon fibers are disposed generally longitudinally in a layer at an intermediate position within the tube wall and are capable of efficiently increasing the stiffness of the shaft. The overall requirement for the carbon fiber component of the fibrous reinforcement is minimized. Glass fibers likewise are disposed generally longitudinally in a layer at an intermediate position within the tube wall and are capable of economically contributing resistance to torsion buckling to the overall drive shaft without deleteriously influencing the critical speed of the drive shaft. The drive shafts of the present invention, accordingly, are light weight and surprisingly capable of yielding reliable service in the absence of harmful secondary powertrain resonance and the concomitant noise associated therewith.

32 Claims, 1 Drawing Figure

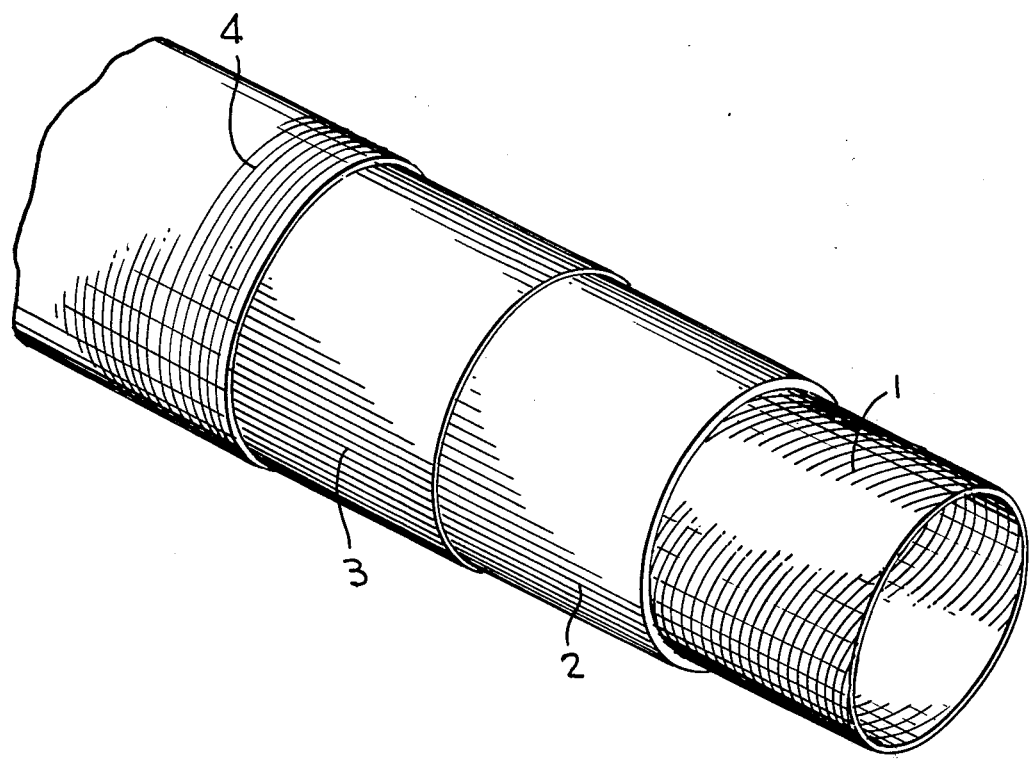

CARBON FIBER REINFORCED COMPOSITE DRIVE SHAFT

BACKGROUND OF THE INVENTION

Mass produced drive shafts for automobiles and other land vehicles have commonly been formed of steel thereby adding significant weight to the overall vehicle.

Additionally, it heretofore has been recognized that vehicles (particularly those with four cylinder engines) sometimes encounter undesirable powertrain noise, e.g. when the engine rotates between 3500 and 5000 RPM. This noise commonly is called "boom". Two techniques have commonly been employed in the automotive industry to solve the "boom" phenomenon. The most popular approach is to replace the one piece steel shaft with a two piece shaft having a center universal thereby increasing the complexity of the driveline. The second approach is to attach mass balance weights to certain points of the driveline, e.g. the transmission extension housing. Each solution adds further weight to the vehicle and increases the cost of production. Additionally, when the former approach is pursued additional maintenance expense may result should the center universal joint require servicing.

Fiber reinforced composite drive shafts have been proposed in the past for use with helicopters and in automotive applications. Such drive shafts have held out the hope of possibly reducing the overall weight of the vehicle. For instance, early composite drive shafts proposed for automotive usage were composed of glass fibers embedded in a resinous matrix (e.g. a thermoset resin). These shafts were found to suffer from lack of stiffness and also exhibited poor fatique characteristics which prevented their commercial application.

More recently, fiber reinforced drive shafts comprising both glass fibers and carbon fibers in a resinous matrix have been disclosed. See published Japanese Application No. 52-127542 entitled "Carbon Fiber Drive Shaft" which claims priority for the filing of U.S. Ser. No. 676,856 on Apr. 14, 1976 by Gordon Peter Worgan and Derek Reginald Smith (now U.S. Pat. No. 4,089,190). See also U.S. Pat. No. 4,041,599 to Derek Reginald Smith which makes passing reference to a carbon fiber reinforced epoxy drive shaft. The former disclosure indicates that a carbon fiber reinforced composite drive shaft or a carbon fiber and glass fiber reinforced composite drive shaft of a specific structural configuration having a maximum longitudinal composite modulus of elasticity of 8 million psi and preferably less than 6 million psi is successful in reducing the noise generated by one piece steel drive shafts and successfully enables the elimination of intermediate universal joints which are commonly employed to reduce powertrain noise in automobiles.

It has been found, however, that the fiber reinforced composite drive shaft proposed in published Japanese Application No. 52-127542 does not provide a solution to "boom" problem experienced in drive shafts of many current automobiles. Accordingly, experimental efforts have continued in seeking to design a reliable fiber reinforced composite drive shaft which is free of undesirable noise generation. Additionally, the cost of carbon fibers has heretofore militated against their utilization as fibrous reinforcement in large quantities in cost critical applications such as drive shafts.

It is an object of the present invention to provide a fiber reinforced composite drive shaft of reduced weight which can be substituted for a steel drive shaft heretofore utilized without loss of service characteristics or the requirement that a costly two piece shaft with a center universal be employed.

It is an object of the present invention to provide a carbon fiber reinforced composite drive shaft which successfully overcomes the noise problem found to be associated with that disclosed in published Japanese Application No. 52-127542.

It is an object of the present invention to provide a fiber reinforced composite drive shaft which requires minimal utilization of relatively more costly carbon fibers without sacrifice of desirable performance characteristics.

It is another object of the present invention to provide an improved light weight carbon fiber reinforced composite drive shaft which can be manufactured on a cost competitive basis compared to conventional steel drive shafts.

These and other objects, as well as the scope, nature, and utilization of the invention will be apparent to those skilled in the art from the following detailed description and appended claims.

SUMMARY OF THE INVENTION

It has been found that a carbon fiber reinforced composite tubular drive shaft having improved service characteristics comprises a plurality of bonded circumferentially disposed layers composed of fibrous reinforcement situated within a resinous matrix material, wherein the innermost layer comprises glass fibers disposed at an angle of from ±30° to ±50° to a line parallel to the longitudinal axis of the shaft, the outermost layer comprises glass fibers disposed at an angle of from ±60° to 90° to a line parallel to the longitudinal axis of the shaft, an intermediate layer comprises glass fibers disposed at an angle of from 0° to ±15° to a line parallel to the longitudinal axis of the shaft, and an intermediate layer comprises carbon fibers disposed at an angle of from 0° to ±15° to a line parallel to the longitudinal axis of the shaft.

DESCRIPTION OF THE DRAWING

The FIGURE shows a sectional cutaway perspective view of a portion of a preferred carbon fiber and glass fiber reinforced drive shaft in accordance with the present invention.

DESCRIPTION OF PREFERRED EMBODIMENTS

It has been observed that the "boom" or noise commonly generated in a powertrain of a vehicle is caused by the entire powertrain (i.e. the engine, transmission, and drive shaft) entering into a second mode bending resonance which can be both a lateral and a vertical excitation. The composite tubular drive shaft of the present invention utilizes a relatively small quantity of carbon fiber reinforcement and surprisingly is capable of yielding reliable service in the absence of harmful secondary powertrain resonance and the concomitant noise associated therewith.

In accordance with the composite drive shaft design concept of the present invention a plurality of bonded circumferentially disposed layers composed of carbon fibers and glass fibers as reinforcement are situated within a resinous matrix material. The fibrous reinforcement is positioned within each circumferential layer in a specific configuration found capable of yielding improved service characteristics.

The carbon fibers which are utilized as fibrous reinforcement contain at least 90 percent carbon by weight (e.g. at least 95 percent carbon by weight) and may be either amorphous or graphitic in nature. Such carbon fibers commonly are available as a multifilament bundle of substantially parallel continuous filaments and possess a tenacity of at least 150,000 psi (e.g. 200,000 to 350,000 psi). Additionally, they are characterized by their relatively low density and high stiffness. Such filaments commonly possess a denier per filament of approximately 0.5 to 2 and a Young's modulus of elasticity of at least 25 million psi (e.g. approximately 30 to 65 million psi). The Young's modulus of elasticity can be determined in accordance with the procedure of ASTM D-2101-64T. Such carbon fibers are commercially available and may be formed by known techniques by the thermal treatment of a variety of polymeric fibrous materials. Preferred carbon fibers are derived from an acrylic precursor. See, for instance, commonly assigned U.S. Pat. Nos. 3,775,520; 3,900,556; and 3,954,950 which are herein incorporated by reference. The carbon fibers preferably are also surface treated following formation so as to improve their adherence to a resinous matrix material. Representative techniques for modifying the surface characteristics of a carbonaceous fibrous material so as to improve adhesion to a resinous matrix material are disclosed in commonly assigned U.S. Pat. Nos. 3,723,150; 3,723,607; 3,745,104; 3,762,941; 3,767,774; 3,821,013; 3,894,884; and 3,859,187, which are herein incorporated by reference.

The glass fibers which serve as fibrous reinforcement commonly also are available as a multifilament bundle of substantially parallel continuous filaments and commonly possess a Young's modulus of elasticity of approximately 8 to 12 million psi. Representative glass fibers which may be utilized are commercially available under the designation of "E-glass" and "S-glass". Other equivalent fibers may be substituted in whole or in part for glass fiber components such as wholly aromatic polyamide fibers (i.e. aramid fibers).

The resinous matrix material in which the carbon fibers and glass fibers are disposed is selected so as to be capable of withstanding the operating temperature of the resulting composite drive shaft and may be either thermosetting or thermoplastic in nature. In a preferred embodiment of the invention the resinous matrix material is a thermosetting resin, e.g. epoxy resin, phenolic resin, polyester resin, polyimide resin. The preferred thermosetting resinous matrix material is an epoxy resin.

The epoxy resin utilized as the resinous matrix material may be prepared by the condensation of bisphenol A (4,4'-isopropylidene diphenol) and epichlorohydrin. Also other polyols, such as aliphatic glycols and novolak resins (e.g., phenol-formaldehyde resins), acids or their active hydrogen containing compounds may be reacted with epichlorohydrin for the production of epoxy resins suitable for use as the resinous matrix material. Epoxy resins are preferably selected which possess or can be modified to possess the requisite flow characteristics prior to curing. Numerous reactive diluents or modifiers which are capable of increasing the flow properties of uncured epoxy resins are well known and include butyl glycidyl ether, higher molecular weight aliphatic and cycloaliphatic mono-glycidyl ethers, styrene oxide, aliphatic and cycloaliphatic diglycidyl ethers, and mixtures of the above.

In preferred embodiments of the invention, epoxy resins are selected to serve as the resinous matrix material which possess terminal epoxide groups and are the condensation product of bisphenol A and epichlorohydrin of the following formula:

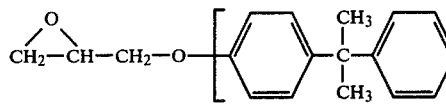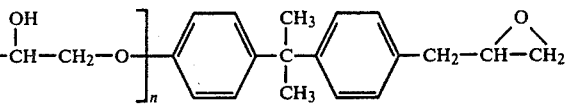

where n varies between zero and a small number less than about 10. When n is zero, the resin prior to curing is a very fluid light-colored material which is essentially the diglycidyl ether of bisphenol A. As the molecular weight increases so generally does the viscosity of the resins. Accordingly, particularly preferred liquid epoxy resins generally possess an n value averaging less than about 1.0. Illustrative examples by standard trade designations of particularly useful commercially available epoxy resins include: Epi-Rez 508, and Epi-Rez 510 (Celanese Coatings), and Epon 828 (Shell) epoxy resins.

A variety of epoxy resin curing agents may be employed in conjunction with the epoxy resin. The curing or hardening of the epoxy resin typically involves further reaction of the epoxy or hydroxyl groups to cause molecular chain growth and cross-linking. The term "curing agent" as used herein is accordingly defined to include the various hardeners of the co-reactant type. Illustrative classes of known epoxy curing agents which may be utilized include aliphatic and aromatic amines, polyamides, tertiary amines, amine adducts, acid anhydrides, acids, aldehyde condensation products, and Lewis acid type catalysts, such as boron trifluoride. The preferred epoxy curing agents for use with the epoxy resin are acid anhydrides (e.g., hexahydrophthalic acid and methylbicyclo[2.2.1]heptene-2,2-dicarboxylic anhydride isomers marketed under the designation Nadic Methyl Anhydride by the Allied Chemical Company), and aromatic amines (e.g., metaphenylene diamine and dimethylaniline).

The term "layer" as used herein specifies a circumferential zone within the wall of the tubular drive shaft wherein the fibrous reinforcement is disposed in a specific configuration and differs from the adjacent zone (s) with respect to the configuration and/or composition of the fibrous reinforcement. A single layer may include a multiple pass alignment or buildup of fibrous reinforcement in a given configuration. The term layer encompasses an alignment wherein the fibrous reinforcement is disposed therein at both plus and minus a given angle which optionally can be builtup in multiple passes.

The bonded circumferentially disposed layers which make up the wall of the drive shaft are positioned so that the innermost layer comprises glass fibers disposed at an angle of from ±30° to ±50° (e.g. ±40° to ±50°) to a line parallel to the longitudinal axis of the shaft, the outermost layer comprises glass fibers disposed at an angle of from ±60° to 90° (e.g. ±80° to 90°) to a line parallel to the longitudinal axis of the shaft, an intermediate layer comprises glass fibers disposed at an angle of from 0° to ±15° (e.g. 0° to ±10°) to a line parallel to the longitudinal axis of the shaft, and an intermediate layer comprises carbon fibers disposed at an angle of from 0° to ±15° (e.g. 0° to ±10°) to a line parallel to the longitudinal axis of the shaft. Additional intermediate layers other than the two identified above optionally may be present so long as they do not adversely influence the performance characteristics of the drive shaft to any significant degree. In a preferred embodiment the intermediate layer comprising carbon fibers is adjacent the outermost layer. One or more additional plies comprising fibrous reinforcement or composed of other protective material optionally may be positioned outside the outermost layer and/or inside the innermost layer so long as the performance characteristics of the drive shaft are not adversely influenced to any significant degree.

In a preferred embodiment the wall of the tubular drive shaft comprises bonded circumferentially disposed layers arranged so that the innermost layer comprises glass fibers disposed at an angle of approximately ±45° to a line parallel to the longitudinal axis of the shaft, the outermost layer comprises glass fibers at an angle of approximately ±80° to a line parallel to the longitudinal axis of the shaft, a first intermediate layer adjacent the innermost layer comprises glass fibers at an angle of approximately ±10° to a line parallel to the longitudinal axis of the shaft, and a second intermediate layer adjacent the first intermediate layer and the outermost layer comprises carbon fibers disposted at an angle of approximately ±10° to a line parallel to the longitudinal axis of the shaft.

In another embodiment the wall of the tubular drive shaft comprises four bonded circumferentially disposed layers arranged so that the innermost layer comprises glass fibers disposed at an angle of approximately ±45° to a line parallel to the longitudinal axis of the shaft, the outermost layer comprises glass fibers disposed at an angle of approximately 90° to a line parallel to the longitudinal axis of the shaft, a first intermediate layer adjacent the innermost layer comprises glass fibers disposed at an angle of approximately 0° to a line parallel to the longitudinal axis of the shaft, and a second intermediate layer adjacent the first intermediate layer and the outermost layer comprises carbon fibers disposed at an angle of approximately 0° to a line parallel to the longitudinal axis of the shaft.

In the drive shafts of the present invention the innermost layer containing glass fibers disposed at an angle of ±30° to ±50° serves as the primary carrier of shear loads. The intermediate layer containing glass fibers disposed at an angle of 0° to ±15° serves the important role of increasing the thickness of the tube wall so as to prevent torsion buckling during use. It has been found that the required resistance to torsion buckling can be provided in this manner without deleteriously influencing the critical speed of the drive shaft so that undesirable noise is produced. The intermediate layer comprising carbon fibers serves the essential roll of stiffening the overall tubular drive shaft so that the critical speed of the shaft is sufficiently elevated above the contemplated operating range so as to preclude undesirable noise during use. The outermost ply comprising glass fibers at an angle of from ±60° to 90° also contributes significantly to the torsion buckling strength of the overall shaft and provides an impact resistant protective sheath. It will be understood, however, that all layers contribute to the carrying of shear loads and provide the required critical speed and torsion buckling characteristics.

The thicknesses of the specific fiber reinforced layers heretofore discussed can be varied in accordance with design principles known to those skilled in the art so that the critical speed of the shaft is sufficiently elevated to a point that no fundamental whirl speed noise problem is encountered within the contemplated end use application. Such design principles are dictated by the Young's modulus of elasticity of the glass and carbon fibers employed, the fiber alignment selected within the ranges specified above, the nature of the other components of the drive shaft (i.e. engine and transmission), the drive shaft diameter, the total tube wall thickness, and the overall length of the drive shaft. Drive shafts can be formed which are capable of operating over a wide range of RPMs, e.g. at a maximum RPM of 3,000 to 10,000.

The drive shafts of the present invention can be formed by a variety of techniques. For instance, a removable mandrel can be provided having an outer diameter which generally corresponds to the inner diameter of the final carbon fiber reinforced composite drive shaft, and the layers positioned thereon. The various layers comprising the fibrous reinforcement can be applied in the appropriate position and configuration by filament winding, tape wrapping, tube rolling, or pultrusion. When a thermosetting resin is employed as the matrix material, a resin curing step next is carried out in order to cross-link and cure the resin, and the mandrel removed.

A preferred technique for accurately positioning the fibrous reinforcement upon the mandrel is filament winding whereby either wet-winding or pre-preg winding is employed. In accordance with the wet-winding technique the fibrous reinforcement bears substantially uncured liquid thermosetting resin upon its surface at the time of winding which commonly is applied by dipping in a vessel containing the same immediately prior to the winding step. When pre-preg winding is employed the fibrous reinforcement bears a partially cured tacky resin upon its surface prior to winding. In each instance the subsequent curing step converts the thermosetting resin into a solid thermoset resin having the fibrous reinforcement incorporated therein. Each layer becomes permanently bonded to the adjacent layer(s) during the curing step. The filament winding production technique is not labor intensive and can be carried out with a high degree of precision on a rapid automated continuous basis utilizing commercially available equipment.

The resulting carbon fiber reinforced composite drive shafts are substantially void-free (preferably less than 2 percent by volume voids) and commonly incorporate the fibrous reinforcement therein in a quantity of about 55 to 70 percent by volume, e.g. about 60 to 65 percent by volume. Additionally, the resulting drive shafts commonly exhibit a longitudinal modulus of elasticity of approximately 5.5 to 20 million, e.g. in excess of 8 million for many applications.

The carbon fiber reinforced composite drive shafts of the present invention can be connected to the drivetrain by a variety of techniques. For instance, they can be attached to conventional yokes by the use of blind fasteners or similar bolting arrangements. Particularly preferred mounting techniques are disclosed in commonly assigned U.S. Ser. No. 890,231, filed concurrently herewith, of Derek N. Yates and John C. Presta entitled "Fiber Reinforced Composite Shaft With Metallic Connector Sleeves Mounted by Longitudinal Groove Interlock", and in commonly assigned U.S. Ser. No. 890,230, filed concurrently herewith, of Derek N. Yates and John C. Presta entitled "Fiber Reinforced Composite Shaft With Metallic Connector Sleeves Mounted by Radial Pin Interlock". These disclosures are herein incorporated by reference.

The carbon fiber reinforced drive shafts of the present invention offer significant advantages when compared to steel drive shafts and fiber reinforced composite drive shafts of the prior art. There is a weight reduction when compared to conventional steel drive shafts. Also, there no longer is a requirement that a two piece shaft be employed in some applications thereby eliminating the need for a costly center bearing and additional yokes and universal joints. Noise problems commonly associated with composite drive shafts of the prior art effectively are eliminated without sacrifice of other required performance characteristics. The claimed drive shafts additionally can be formed on an economical basis while minimizing the need for excessive quantities of the relatively more expensive carbon fibers.

The following Examples are given as specific illustrations of the claimed carbon fiber reinforced composite drive shafts. It is contemplated that the specific drive shafts described are particularly suited for light truck applications. The concept of the present invention is not so limited however. In each instance four circumferentially disposed layers composed of fibrous reinforcement situated within an epoxy matrix are provided. Each layer is applied by the wet winding of a multifilament fiber bundle employing a McClean-Anderson filament winder. The fibrous reinforcement bearing the uncured epoxy resin is supported upon a removable mandrel (not shown in drawing) during the filament winding, the epoxy resin is cured to form an integral tubular structure, and the mandrel is removed. In each instance the drive shaft has a length of approximately 69.5 inches and an internal diameter of 4 inches. The void content of the resulting drive shafts is less than 2 percent by volume, and fibrous reinforcement comprises approximately 60 percent by volume. The respective layers (i.e. from innermost to outermost) are numbered as indicated in the drawing.

EXAMPLE I

| Layer No. | Thickness | Fiber Reinforcement | Fiber Angle |
|---|---|---|---|
| 1 | 0.020 inch | E-glass fiber | ±45° |
| 2 | 0.074 | E-glass fiber | 0° |
| 3 | 0.014 | Celion ®high strength carbon fiber marketed by the Celanese Corporation having a Young's modulus of elasticity of approximately 32 million psi | 0° |
| 4 | 0.012 inch | E-glass fiber | 90° |

The resulting drive shaft exhibits a total weight of approximately 7.38 lbs., a longitudinal modulus of elasticity of approximately 6.5 million, and a critical shaft speed of approximately 4900 RPM (81.68 HZ.).

EXAMPLE II

| Layer No. | Thickness | Fiber Reinforcement | Fiber Angle |
|---|---|---|---|
| 1 | 0.020 inch | E-glass fiber | ±45° |
| 2 | 0.070 inch | E-glass fiber | ±10° |
| 3 | 0.017 inch | Celion ®high strength carbon fiber marketed by the Celanese Corporation having a Young's modulus of elasticity of approximately 32 million psi | ±10° |
| 4 | 0.012 inch | E-glass fiber | ±80° |

The resulting drive shaft exhibits a total weight of approximately 7.28 lbs., a longitudinal modulus of elasticity of approximately 6.4 million, and a critical shaft speed of approximately 4880 RPM (81.35 HZ.).

EXAMPLE III

| Layer No. | Thickness | Fiber Reinforcement | Fiber Angle |
|---|---|---|---|
| 1 | 0.020 inch | E-glass fiber | ±45° |
| 2 | 0.082 inch | E-glass fiber | 0° |
| 3 | 0.008 inch | Celion ®high modulus carbon fiber marketed by the Celanese Corporation having a Young's modulus of elasticity of approximately 55 million psi | 0° |
| 4 | 0.010 inch | E-glass fiber | 90° |

The resulting drive shaft exhibits a total weight of approximately 7.47 lbs., a longitudinal modulus of elasticity of approximately 6.6 million, and a critical shaft speed of approximately 4895 RPM (81.59 HZ.).

EXAMPLE IV

| Layer No. | Thickness | Fiber Reinforcement | Fiber Angle |
|---|---|---|---|
| 1 | 0.020 inch | E-glass fiber | ±45° |
| 2 | 0.080 inch | E-glass fiber | ±10° |
| 3 | 0.010 inch | Celion ®high modulus carbon fiber marketed by the Celanese Corporation having a Young's modulus of elasticity of approximately 55 million psi | ±10° |
| 4 | 0.010 inch | E-glass fiber | ±80° |

The resulting drive shaft exhibits a total weight of approximately 7.45 lbs., a longitudinal modulus of elasticity of approximately 6.5 million, and a critical shaft speed of approximately 4889 RPM (81.49 HZ.).

Although the invention has been described with preferred embodiments for a specific end use application, it is to be understood that variations and modifications may be resorted to within the overall concept disclosed as will be apparent to those skilled in the art. Such variations and modifications are to be considered within the purview and scope of the claims appended hereto.

We claim:

1. A carbon fiber reinforced composite tubular drive shaft having improved service characteristics comprising a plurality of bonded circumferentially disposed layers composed of fibrous reinforcement situated within a resinous matrix material, wherein the innermost layer comprises glass fibers disposed at an angle of from ±30° to ±50° to a line parallel to the longitudinal axis of said shaft, the outermost layer comprises glass fibers disposed at an angle of from ±60° to 90° to a line parallel to the longitudinal axis of said shaft, an intermediate layer comprises glass fibers disposed at an angle of from 0° to ±15° to a line parallel to the longitudinal axis of said shaft, and an intermediate layer comprises carbon fibers disposed at an angle of from 0° to ±15° to a line parallel to the longitudinal axis of said shaft.

2. A carbon fiber reinforced composite tubular drive shaft in accordance with claim 1 wherein the longitudinal modulus of elasticity is approximately 5.5 to 20 million psi.

3. A carbon fiber reinforced composite tubular drive shaft in accordance with claim 1 wherein said resinous matrix material is a thermoset resin.

4. A carbon fiber reinforced composite tubular drive shaft in accordance with claim 3 wherein said thermoset resin is an epoxy resin.

5. A carbon fiber reinforced composite tubular drive shaft in accordance with claim 1 wherein said carbon fibers posses a Young's modulus of elasticity of at least 25 million psi prior incorporation in said intermediate layer.

6. A carbon fiber reinforced composite tubular drive shaft in accordance with claim 1 wherein said intermediate layer comprising said carbon fibers is adjacent said outermost layer.

7. A carbon fiber reinforced composite tubular drive shaft in accordance with claim 1 which consists of four layers.

8. A carbon fiber reinforced composite tubular drive shaft in accordance with claim 1 wherein said fibrous reinforcement comprises about 55 to 70 percent by volume.

9. A carbon fiber reinforced composite tubular drive shaft in accordance with claim 1 wherein said innermost layer comprising glass fibers is disposed at an angle of approximately ±45° to a line parallel to the longitudinal axis of said shaft, said outermost layer comprising glass fibers is disposed at an angle of approximately 90° to a line parallel to the longitudinal axis of said shaft, said intermediate layer comprising glass fibers is disposed at an angle of approximately 0° to a line parallel to the longitudinal axis of said shaft, and said intermediate layer comprising carbon fibers is disposed at an angle of approximately 0° to a line parallel to the longitudinal axis of said shaft.

10. A carbon fiber reinforced composite tubular drive shaft in accordance with claim 1 wherein said innermost layer comprising glass fibers is disposed at an angle of approximately ±45° to a line parallel to the longitudinal axis of said shaft, said outermost layer comprising glass fibers is disposed at an angle of approximately ±80° to a line parallel to the longitudinal axis of said shaft, said intermediate layer comprising glass fibers is disposed at an angle of approximately ±10° to a line parallel to the longitudinal axis of said shaft, and said intermediate layer comprising carbon fibers is disposed at an angle of approximately ±10° to a line parallel to the longitudinal axis of said shaft.

11. A carbon fiber reinforced composite tubular drive shaft suitable for use with land vehicles having a longitudinal modulus of elasticity of approximately 5.5 to 20 million psi and improved service characteristics comprising a plurality of bonded circumferentially disposed layers composed of fibrous reinforcement situated within a resinous matrix material, wherein the innermost layer comprises glass fibers disposed at an angle of ±40° to ±50° to a line parallel to the longitudinal axis of said shaft, the outermost layer comprises glass fibers disposed at an angle of ±80° to 90° to a line parallel to the longitudinal axis of said shaft, an intermediate layer comprises glass fibers disposed at an angle of 0° to ±10° to a line parallel to the longitudinal axis of said shaft, and an intermediate layer comprises carbon fibers disposed at an angle of 0° to ±10° to a line parallel to the longitudinal axis of said shaft.

12. A carbon fiber reinforced composite tubular drive shaft in accordance with claim 11 having a longitudinal modulus of elasticity in excess of 8 million psi.

13. A carbon fiber reinforced composite tubular drive shaft in accordance with claim 11 wherein said resinous matrix material is a thermoset resin.

14. A carbon fiber reinforced composite tubular drive shaft in accordance with claim 13 wherein said thermoset resin is an epoxy resin.

15. A carbon fiber reinforced composite tubular drive shaft in accordance with claim 11 wherein said carbon fibers possess a Young's modulus of elasticity of approximately 30 to 65 million psi prior to incorporation in said intermediate layer.

16. A carbon fiber reinforced composite tubular drive shaft in accordance with claim 11 wherein said intermediate layer comprising said carbon fibers is adjacent said outermost layer.

17. A carbon fiber reinforced composite tubular drive shaft in accordance with claim 11 which consists of four layers.

18. A carbon fiber reinforced composite tubular drive shaft in accordance with claim 11 wherein said fibrous reinforcement comprises about 55 to 70 percent by volume.

19. A carbon fiber reinforced composite tubular drive shaft suitable for use with land vehicles having a longitudinal modulus of elasticity of approximately 5.5 to 20 million psi and improved service characteristics comprising four bonded circumferentially disposed layers composed of fibrous reinforcement situated within a resinous matrix material, wherein the innermost layer comprises glass fibers disposed at an angle of approximately ±45° to a line parallel to the longitudinal axis of said shaft, the outermost layer comprises glass fibers disposed at an angle of approximately ±80° to a line parallel to the longitudinal axis of said shaft, a first intermediate layer adjacent said innermost layer comprises glass fibers disposed at an angle of approximately ±10° to a line parallel to the longitudinal axis of said shaft, and a second intermediate layer adjacent said first intermediate layer and said outermost layer comprises carbon fibers disposed at an angle of approximately ±10° to a line parallel to the longitudinal axis of said shaft.

20. A carbon fiber reinforced composite tubular drive shaft in accordance with claim 19 having a longitudinal modulus of elasticity in excess of 8 million psi.

21. A carbon fiber reinforced composite tubular drive shaft in accordance with claim 19 wherein said resinous matrix is a thermoset resin.

22. A carbon fiber reinforced composite tubular drive shaft in accordance with claim 21 wherein said thermoset resin is an epoxy resin.

23. A carbon fiber reinforced composite tubular drive shaft in accordance with claim 21 formed by filament winding upon a mandrel having an outer diameter which corresponds to the inner diameter of said shaft said fibrous reinforcement bearing an uncured thermosetting resin, curing said thermosetting resin, and removing the mandrel.

24. A carbon fiber reinforced composite tubular drive shaft in accordance with claim 19 wherein said carbon fibers possess a Young's modulus of elasticity of approximately 30 to 65 million psi prior to incorporation in said intermediate layer.

25. A carbon fiber reinforced composite tubular drive shaft in accordance with claim 19 wherein said fibrous reinforcement comprises about 55 to 70 percent by volume.

26. A carbon fiber reinforced composite tubular drive shaft suitable for use with land vehicles having a longitudinal modulus of elasticity of approximately 5.5. to 20 million psi and improved service characteristics comprising four bonded circumferentially disposed layers composed of fibrous reinforcement situated within a resinous matrix material, wherein the innermost layer comprises glass fibers disposed at an angle of approximately ±45° to a line parallel to the longitudinal axis of said shaft, the outermost layer comprises glass fibers disposed at an angle of approximately 90° to a line parallel to the longitudinal axis of said shaft, a first intermediate layer adjacent said innermost layer comprises glass fibers disposed at an angle of approximately 0° to a line parallel to the longitudinal axis of said shaft, and a second intermediate layer adjacent said first intermediate layer and said outermost layer comprises carbon fibers disposed at an angle of approximately 0° to a line parallel to the longitudinal axis of said shaft.

27. A carbon fiber reinforced composite tubular drive shaft in accordance with claim 26 having a longitudinal modulus of elasticity in excess of 8 million psi.

28. A carbon fiber reinforced composite tubular drive shaft in accordance with claim 26 wherein said resinous matrix is a thermoset resin.

29. A carbon fiber reinforced composite tubular drive shaft in accordance with claim 28 wherein said thermoset resin is an epoxy resin.

30. A carbon fiber reinforced composite tubular drive shaft in accordance with claim 28 formed by filament winding upon a mandrel having an outer diameter which corresponds to the inner diameter of said shaft said fibrous reinforcement bearing an uncured thermosetting resin, curing said thermosetting resin, and removing the mandrel.

31. A carbon fiber reinforced composite tubular drive shaft in accordance with claim 26 wherein said carbon fibers possess a Young's modulus of elasticity of approximately 30 to 65 million psi prior to incorporation in said intermediate layer.

32. A carbon fiber reinforced composite tubular drive shaft in accordance with claim 26 wherein said fibrous reinforcement comprises about 55 to 70 percent by volume.

* * * * *